United States Patent [19]

Miller et al.

[11] Patent Number: 4,573,250
[45] Date of Patent: Mar. 4, 1986

[54] METHOD OF REPAIRING A PISTON SHAFT ASSEMBLY OF A RAILWAY CAR END-OF-CAR CUSHIONING UNIT

[76] Inventors: Dennis Miller, 6267 Curtis Ave., Omaha, Nebr. 68104; Scott R. Koch, 6803 Minne Lusa Blvd., Omaha, Nebr. 68112

[21] Appl. No.: 541,711
[22] Filed: Oct. 13, 1983
[51] Int. Cl.⁴ .............................................. B23P 11/02
[52] U.S. Cl. ................................. 29/447; 29/DIG. 35; 29/402.08; 29/402.06; 29/402.11; 29/156.5 R; 123/193 P
[58] Field of Search ............. 29/401.1, 402.01, 402.03, 29/402.04, 402.05, 402.06, 402.07, 402.08, 402.09, 402.11, 402.12, 402.13, 402.14, 402.16, 402.18, 402.19, 447, 156.5 R, DIG. 35; 123/193 P

[56] References Cited

U.S. PATENT DOCUMENTS

| | | | |
|---|---|---|---|
| 2,752,668 | 7/1956 | Sheen | 29/402.11 |
| 3,724,059 | 4/1973 | Celovsky | 29/426 |
| 3,725,994 | 4/1973 | Wechsler | 29/447 |
| 3,990,141 | 11/1976 | Stark | 29/596 |
| 4,044,655 | 8/1977 | Kennicott | 92/258 |
| 4,121,331 | 10/1978 | Fukuma et al. | 29/434 |
| 4,133,094 | 1/1979 | Stafford | 29/447 |
| 4,211,192 | 7/1980 | Baumgartner et al. | 123/90.6 |
| 4,376,335 | 3/1983 | Furukawa et al. | 29/447 |
| 4,501,192 | 2/1985 | Knödel | 29/156.5 R |

Primary Examiner—Mark Rosenbaum
Assistant Examiner—Vernon K. Rising
Attorney, Agent, or Firm—Zarley, McKee, Thomte, Voorhees & Sease

[57] ABSTRACT

A method of fixing an annular piston onto a piston shaft includes providing an annular piston with a central bore having a diameter slighty less than the shaft diameter, heating the annular piston to expand the bore diameter and then placing the heated piston onto the shaft so that the piston, upon cooling, is permanently shrink-fit onto the shaft. In an end-of-car cushioning unit for a railway car, the prior shaft is cut adjacent the piston and the piston is rebored to a diameter slightly less than the diameter of the end portion of the piston onto which it is to be shrink-fitted.

11 Claims, 8 Drawing Figures

METHOD OF REPAIRING A PISTON SHAFT ASSEMBLY OF A RAILWAY CAR END-OF-CAR CUSHIONING UNIT

BACKGROUND OF THE INVENTION

The present invention is directed generally to a method of fixing an annular piston onto a piston shaft and more particularly to a method of repairing the piston shaft assembly of a railway car end-of-car cushioning unit.

Many railway cars are equipped with an end-of-car cushioning unit on each end. An end-of-car cushioning unit is basically a hydraulic shock absorber interposed between the coupler arm and railway car frame to absorb impact forces and thereby provide a safe or smoother ride for the railway car.

Each end-of-car cushioning unit includes a piston shaft assembly which is subject to wear and breakage. In fact, the piston shafts are generally provided with an annular recess adjacent one end so that the shaft will intentionally break at the recess under abnormal loads to prevent damage to other more expensive portions of the units. The piston shaft assembly may be replaced with a new piston shaft assembly at considerable expense.

There has not heretofore been developed a method for securely yet inexpensively fixing an annular piston onto a piston shaft. One existing method is by a friction weld or inertia weld, which is accomplished by spinning the piston and shaft in opposite directions such that the friction melts the metal and permanently fuses the piston onto the shaft. Very expensive equipment is required for the friction welding operation, however.

Another possibility is to externally weld a piston onto the shaft but this method has the disadvantages of limited penetration of the weld and the necessity that the welded assembly be heat normalized since the metal gets brittle above 2000° F. For example, the piston shaft assemblies could be placed in a furnace at about 1400° F. for about three hours. A large furnace would be required for the assemblies and some type of crane or hoist would be needed for handling the heavy assemblies.

Neither process provides for use of the original piston from the broken piston shaft assembly.

A primary object of the invention is therefore to provide a method for securely yet economically fixing an annular piston onto a piston shaft.

Another object is to provide such a method which can be readily accomplished with conventional machine shop equipment.

Another object is to provide such a method which does not require a separate heat normalizing process for the piston shaft assembly.

Another object is to provide a method of repairing a piston shaft assembly of an end-of-car cushioning unit wherein the original piston may be salvaged and reused.

These and other objects of the invention are resolved by the method of the present invention, as explained hereinbelow.

SUMMARY OF THE INVENTION

The method of the present invention includes providing a piston shaft having an end portion of a first diameter and an annular piston with a central bore having a diameter slightly less than the diameter of the shaft end portion. The piston is heated to a temperature sufficient to expand the bore diameter to at least the diameter of the shaft end portion, whereupon the heated piston is placed onto the shaft such that the end portion is received in the piston bore. The heated assembly is then cooled whereby the piston is rigidly shrink-fit onto the piston shaft end portion.

In the repair of a piston shaft assembly of a railway car end-of-car cushioning unit, the original piston may be salvaged by removing the piston shaft assembly from the end-of-car cushioning unit, sawing the piston shaft adjacent the piston and then axially boring the piston to provide a central bore of a diameter slightly less than the diameter of the new shaft end portion. The piston is heated to expand the bore diameter so that the piston can be placed onto the end portion of a new shaft and cooled for a secure shrink-fit thereon. The cooled new piston shaft assembly is then installed into the end-of-car cushioning unit.

The method of the present invention can thus be readily accomplished with conventional machine shop equipment. The original pistons are salvaged and reused. The heating step of the invention anneals the piston which generally will have become wear hardened during use. A small oven will suffice for the heating process since only the pistons need be heated therein. Furthermore, the time required for heating the piston is limited to that needed to raise the temperature sufficiently to expand the central bore of the piston so that it will fit onto the shaft end portion.

DESCRIPTION OF THE PREFERRED EMBODIMENT

Figure 1:
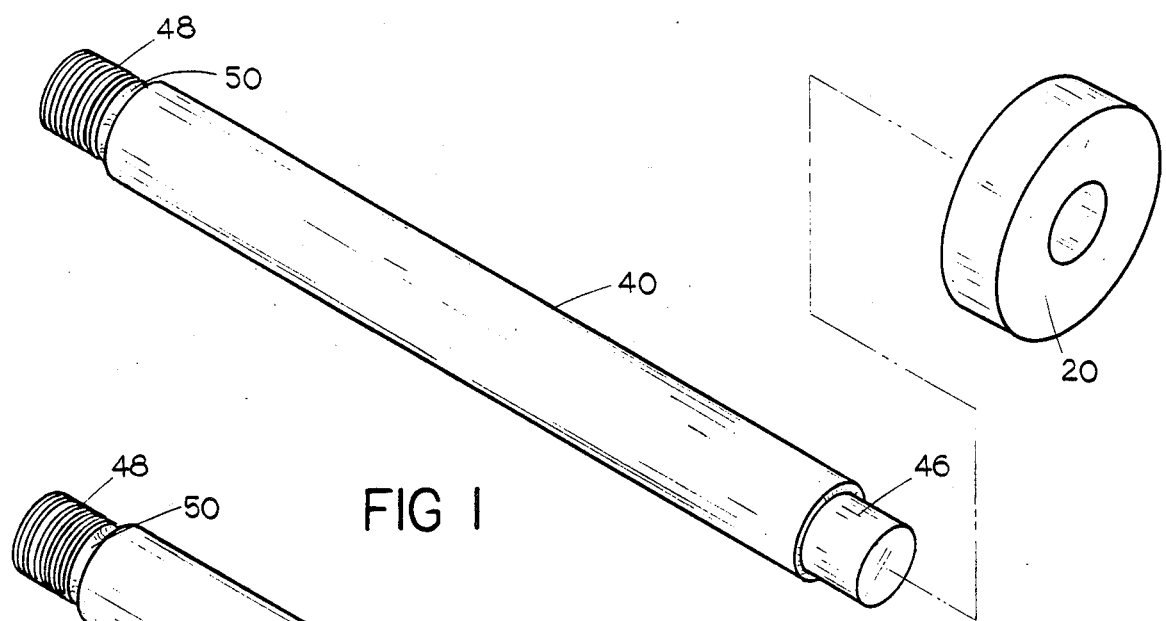
FIG. 1 is an exploded perspective view showing the annular piston adjacent the reduced shaft end on which it is placed.
Figure 2:
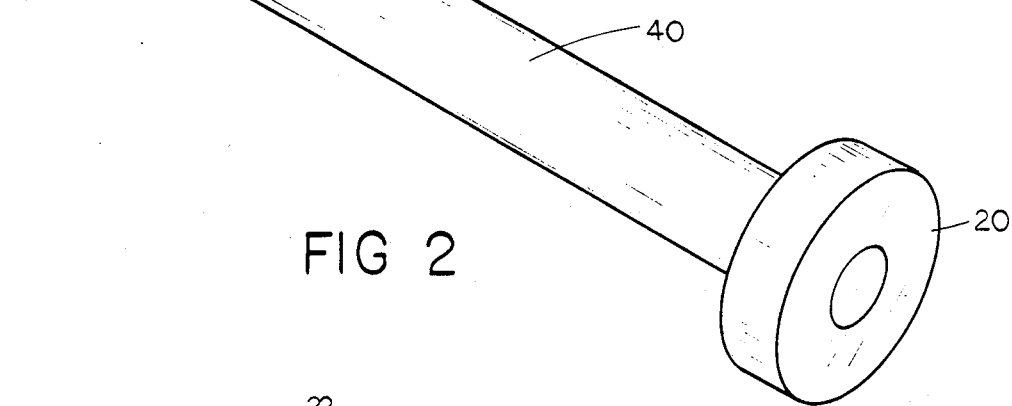
FIG. 2 is a perspective view of the piston and shaft assembly.
Figure 3:
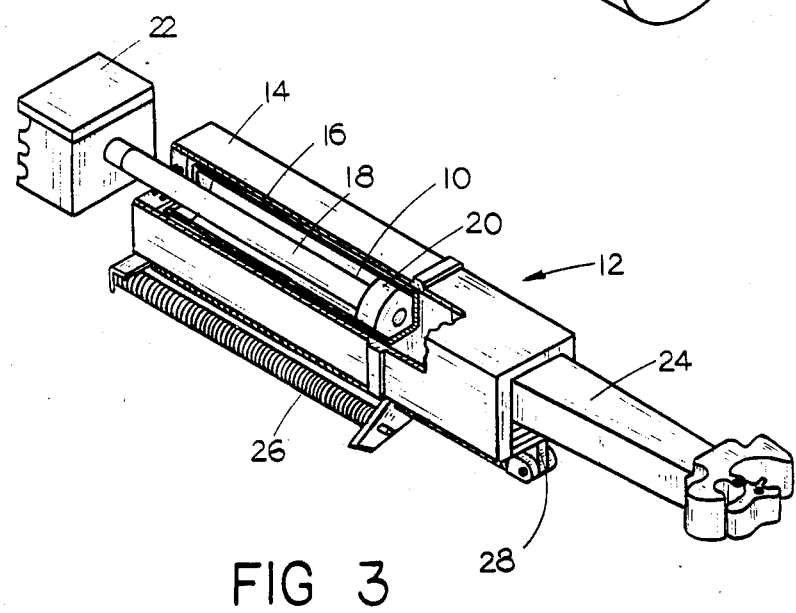
FIG. 3 is a diagrammatic illustration of a railway end-of-car cushioning unit with portions broken away to show the piston and shaft therein.

The method of fixing an annular piston onto a piston shaft, according to the present invention, is described herein in connection with the repair of a piston shaft assembly 10 of a railway car end-of-car cushioning unit 12, as shown in FIG. 3. The end-of-car cushioning unit is conventional equipment well-known in the railway industry. A typical unit 12 includes an elongated housing 14 in which a cylinder 16 is mounted. A piston shaft 18 carries a piston 20 which is reciprocally movable within cylinder 16. The opposite end of the piston shaft is connected to an anchor assembly 22 for connecting the piston to the sill of a railway car. The anchor assembly 22 houses a spherical bearing assembly which is threaded onto the outer end of the piston shaft. The forward end of housing 14 provides for connection to the drawbar or coupler 24. A restoring mechanism 26 provides resilient interconnection between the railway car sill and a depending lug 28 at the forward end of the housing.

Figure 6:
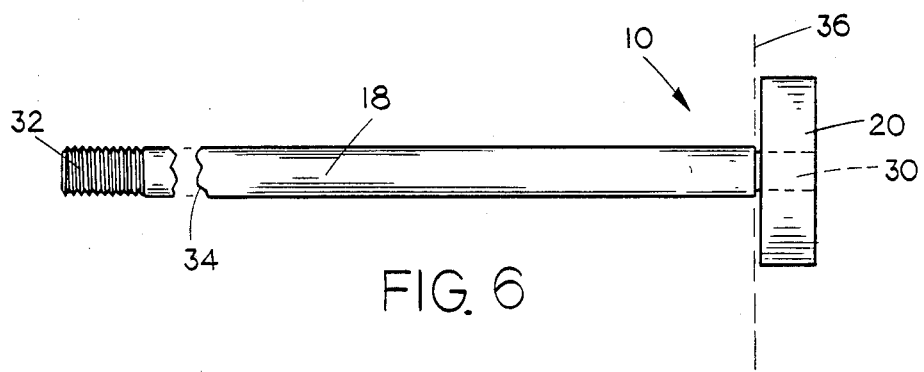
FIG. 6 is a side view of a broken piston shaft assembly.

FIG. 6 shows a piston shaft assembly 10 which has been removed from an end-of-car cushioning unit 12. Assembly 10 includes a piston 20 fixed onto a reduced end portion 30 of piston shaft 18. The free threaded end 32 of shaft 18 has been broken off at a position corresponding to an annular recess 34 which is provided for this purpose to prevent damage to other parts of the unit under abnormal loads.

Figure 7:
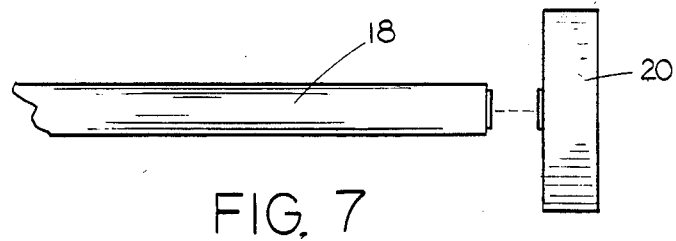
FIG. 7 is a side view showing the original piston cut from the original shaft.
Figure 8:
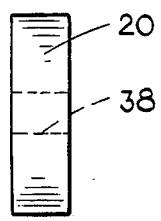
FIG. 8 is an elevational view of the original piston with an axial bore therethrough.

To salvage the piston 20 from assembly 10, shaft 18 is cut by sawing through it at a position adjacent piston 20 such as along the plane indicated by dotted line 36 in FIG. 6. FIG. 7 shows the piston 20 after it has been cut from the shaft. The next step is to bore out the piston 20 to provide a central bore 38 (FIG. 8) for receiving a new shaft.

Figure 4:
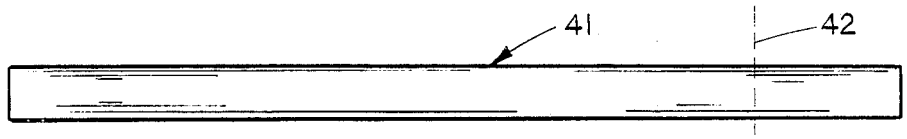
FIG. 4 shows a piece of bar stock from which a new shaft is to be cut.
Figure 5:
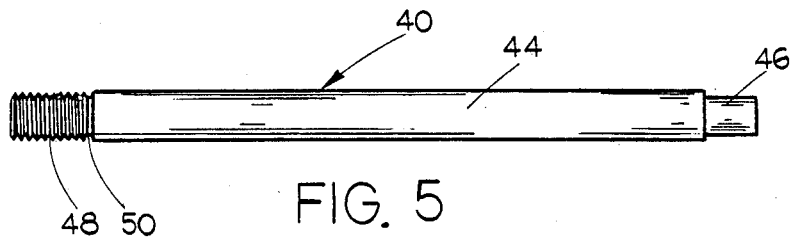
FIG. 5 is a side view of a new shaft.

A new shaft may be fabricated from an elongated length of bar stock 41 as shown in FIG. 4. The bar stock is cut to length along dotted line 42. Next, the exterior surface 44 of the new shaft is finished to a uniform shaft diameter of 3.247 inches, for example. The dimensions recited herein are not critical to the present invention but are typical for a piston and shaft adapted for use in an end-of-car cushioning unit. A 2½ inch long end portion 46 of new shaft 40 is then turned down or finished to a diameter of 3.000 inches. Threads 48 are turned on the opposite end of new shaft 40 and an annular recess 50 is cut adjacent the threads as a failsafe breakage point. New shaft 40 is thus complete and ready to receive the piston 20 onto its reduced end portion 46.

The center bore 38 of piston 20, however, has a diameter slightly less than the diameter of the shaft end portion 46. In the illustrated embodiment, the piston bore 38 has a 2.994 inch diameter. Accordingly, that diameter must be expanded by at least 0.006 inches in order to fit onto the shaft end portion 46.

Expansion of the piston bore is accomplished by heating the piston in an oven. The temperature to which the piston must be heated to expand the center bore by 0.006 inches is calculated by the formula alpha x t=0.006, where alpha is the value of the co-efficient for steel (0.0000065) and t is the temperature in degrees Fahrenheit that the member must be raised above room temperature. Solving the above equation for t yields t=0.006/0.0000065 or 923° F. Thus heating the 8 inch diameter piston having a bore of 2.994 inches to a temperature of 923° F. above room temperature will expand the central bore diameter by 0.006 inches so that it may be slid onto the shaft end portion 46.

Upon cooling to room temperature, the piston becomes permanently shrink-fit onto the shaft end portion.

The force required to axially remove the piston 20 from new shaft 40 is a function of the true tangential tensile stress at the interior surface of the piston. Tensile stress is calculated by the formula A=[T(1+C)]/30,000,000 where A equals the press-fit of the shaft (0.006); C equals the ratio of the steel shaft and piston, namely 8/3, which equals 2.6 which renders 0.397 for the steel piston. Solving the above equation for T indicates a tensile stress of 128,847.53 pounds per square inch. Since the surface area of shaft end portion 46 is 23.562 square inches, the force required to remove piston 20 from the new shaft 40 will be 23.562×128,847.53 or 3,035,905.5 pounds. Since the maximum expected load on the piston shaft assembly 10 of an end-of-car cushioning unit is only a small fraction of this figure, the piston will remain fixed onto the end of new shaft 40 throughout the useful life of the new shaft.

Thus there has been shown and described a method of repairing the piston shaft assembly of an end-of-car cushioning unit, which method accomplishes at least all of the stated objects.

I claim:

1. A method of repairing a piston shaft assembly of a railway car cushioning unit, said piston shaft assembly including a piston fixedly mounted on a piston shaft, comprising, providing an elongated bar stock for a new shaft, sawing said bar stock to length for a new shaft, finishing an end portion of said new shaft to a first diameter, providing a piston shaft assembly for a railway car cushioning unit, sawing said piston shaft adjacent the piston, thereby to separate said piston from said piston shaft, axially boring said piston to provide a bore of a diameter slightly less than said first diameter, heating said piston to a temperature sufficient to expand the bore diameter to at least said first diameter, placing the heated piston onto said end portion of said new shaft, and cooling said piston whereby said piston is shrink-fit onto said new piston shaft end portion.

2. A method of repairing a piston shaft assembly of a railway car end-of-car cushioning unit, said piston shaft assembly including a piston fixedly mounted on a piston shaft, comprising, providing an elongated bar stock for a new shaft, sawing said bar stock to length for a new shaft, finishing an end portion of said new shaft to a first diameter, providing a piston shaft assembly for an end-of-car cushioning unit, sawing said piston shaft adjacent the piston, thereby to separate said piston from said piston shaft, axially boring said piston to provide a bore of a diameter slightly less than said first diameter, heating said piston to a temperature sufficient to expand the bore diameter to at least said first diameter, placing the heated piston onto said end portion of said new shaft, and cooling said piston whereby said piston is shrink-fit onto said new piston shaft end portion.

3. The method of claim 2 further comprising turning threads on the end of said new shaft opposite said piston.

4. The method of claim 3 further comprising providing an annular recess in the new shaft adjacent said threads.

5. The method of claim 4 further comprising finishing the exterior surface of said new shaft to a uniform shaft diameter.

6. The method of claim 5 wherein said first diameter is less than said uniform shaft diameter.

7. The method of claim 6 wherein said piston shaft includes an annular shoulder adjacent said end portion and the step of placing the heated piston onto said end portion comprises engaging said piston against said shoulder.

8. The method of claim 7 wherein said bore diameter is between 0.005 and 0.007 inches less than said first diameter.

9. The method of claim 8 wherein the step of heating said piston comprises placing said piston in an oven and energizing the oven to heat the piston.

10. The method of claim 9 wherein the step of cooling said piston comprises storing said piston until the temperature thereof is lowered substantially to the ambient temperature.

11. The method of claim 2 further comprising removing said piston shaft assembly from the end-of-car cushioning unit and installing said piston and new piston shaft into said end-of-car cushioning unit.

* * * * *

UNITED STATES PATENT AND TRADEMARK OFFICE
CERTIFICATE OF CORRECTION

PATENT NO. : 4,573,250
DATED : March 4, 1986
INVENTOR(S) : Dennis Miller and Scott R. Koch It is certified that error appears in the above-identified patent and that said Letters Patent are hereby corrected as shown below:

On the cover sheet, after the names of the inventors, add the following:

[73] Assignee of half interest: American Hydraulics, Inc., Omaha, Nebraska.

Signed and Sealed this

First Day of July 1986

[SEAL]

Attest:

*Attesting Officer*

DONALD J. QUIGG

*Commissioner of Patents and Trademarks*